(12) United States Patent
Kitsunai

(10) Patent No.: US 12,399,130 B2
(45) Date of Patent: Aug. 26, 2025

(54) INFORMATION PROCESSING APPARATUS, IMAGING APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Takahiro Kitsunai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 18/317,290

(22) Filed: May 15, 2023

(65) Prior Publication Data
US 2023/0384236 A1    Nov. 30, 2023

(30) Foreign Application Priority Data
May 31, 2022 (JP) .................... 2022-088305

(51) Int. Cl.
     *G01N 21/88*      (2006.01)
     *G06T 5/77*      (2024.01)
     *G06V 10/25*      (2022.01)

(52) U.S. Cl.
     CPC .......... *G01N 21/8851* (2013.01); *G06T 5/77* (2024.01); *G06V 10/25* (2022.01)

(58) Field of Classification Search
     CPC ...... G01N 21/8851; G06T 5/77; G06V 10/25; G03B 17/565; G03B 35/08; G03B 35/10
See application file for complete search history.

(56) References Cited

U.S. PATENT DOCUMENTS

2022/0383467 A1\* 12/2022 Katz ................... H04N 13/257

FOREIGN PATENT DOCUMENTS

| JP | 2007-189467 A | 7/2007 |
|---|---|---|
| JP | 2009-152804 A | 7/2009 |

\* cited by examiner

*Primary Examiner* — Georgia Y Epps
*Assistant Examiner* — Monica T Taba
(74) *Attorney, Agent, or Firm* — Cowan, Liebowitz & Latman, P.C.

(57) ABSTRACT

An information processing apparatus includes: a processor; and a memory storing a program which, when executed by the processor, causes the information processing apparatus to acquire a captured image, acquire lens information on a first optical system and a second optical system in a case where the captured image includes a first area corresponding to a first optical image input via the first optical system, and a second area corresponding to a second optical image having a predetermined parallax with respect to the first optical image and input via the second optical system, acquire foreign matter information indicating one or a plurality of foreign matter areas in the captured image, correct a position of the first area and a position of the second area on a basis of the lens information, and adjust the foreign matter information on a basis of the lens information.

11 Claims, 14 Drawing Sheets

EXTERNAL STORAGE DEVICE

FIG. 8A

| LENS DESIGN VALUE |
| LENS INDIVIDUAL VALUE |
| LENS FLAG |
| LENS FOCAL LENGTH |
| LENS TEMPERATURE |

FIG. 8B

| | |
|---|---|
| LENS DESIGN VALUE | IMAGE CIRCLE POSITION |
| | IMAGE CIRCLE DIAMETER |
| | ANGLE OF VIEW |
| | DISTORTION CORRECTION COEFFICIENT |
| LENS INDIVIDUAL VALUE | IMAGE CIRCLE POSITION DEVIATION |
| | OPTICAL AXIS TILT |
| | IMAGE MAGNIFICATION DEVIATION |

INFORMATION PROCESSING APPARATUS, IMAGING APPARATUS, INFORMATION PROCESSING METHOD, AND NON-TRANSITORY COMPUTER READABLE MEDIUM

BACKGROUND OF THE INVENTION

Field of the Invention

The present invention relates to an information processing apparatus, an imaging apparatus, an information processing method, and a non-transitory computer readable medium.

Description of the Related Art

A camera having a lens unit having two optical systems mounted thereon and capable of acquiring an image including two areas having parallax is known. In an image of an object captured by the lens unit having two optical systems (one captured image including two areas having parallax), a positional relationship between the two areas and a positional relationship between the two optical systems are reversed. Therefore, when VR content or the like is generated, left and right areas of a captured image are switched so that the positional relationship between the two optical systems and the positional relationship between the two areas are the same.

Further, in a camera with interchangeable lenses, foreign matter (dust) may adhere to an imaging device, or the like, and the quality of a captured image may be degraded. Japanese Patent Application Publication Nos. 2007-189467 and 2009-152804 disclose processing apparatuses that correct a captured image according to foreign matter information at the time of photographing by adding the foreign matter information to the captured image.

However, the foreign matter information includes information on coordinates of foreign matter, and when left and right areas are switched, the coordinates of the foreign matter indicated by the foreign matter information deviates from actual coordinates of the foreign matter. Therefore, there is a problem that foreign matter removal processing cannot be executed correctly. In order to avoid this problem, it is conceivable to perform the foreign matter removal processing before switching the left and right areas, but the foreign matter removal processing may not be able to be performed first depending on restrictions on a processing order or a processing procedure set by the user.

SUMMARY OF THE INVENTION

The present invention provides a technique that allows foreign matter to be removed with high accuracy from a captured image even after areas in a captured image have been switched.

The present invention in its first aspect provides an information processing apparatus including: a processor; and a memory storing a program which, when executed by the processor, causes the information processing apparatus to acquire a captured image, acquire lens information on a first optical system and a second optical system in a case where the captured image includes a first area corresponding to a first optical image input via the first optical system, and a second area corresponding to a second optical image having a predetermined parallax with respect to the first optical image and input via the second optical system, acquire foreign matter information indicating one or a plurality of foreign matter areas in the captured image, correct a position of the first area and a position of the second area on a basis of the lens information, and adjust the foreign matter information on a basis of the lens information.

The present invention in its second aspect provides an information processing method including: acquiring a captured image, acquiring lens information on a first optical system and a second optical system in a case where the captured image includes a first area corresponding to a first optical image input via the first optical system, and a second area corresponding to a second optical image having a predetermined parallax with respect to the first optical image and input via the second optical system, acquiring foreign matter information indicating one or a plurality of foreign matter areas in the captured image, correcting a position of the first area and a position of the second area on a basis of the lens information, and adjusting the foreign matter information on a basis of the lens information.

Further features of the present invention will become apparent from the following description of exemplary embodiments with reference to the attached drawings.

BRIEF DESCRIPTION OF THE DRAWINGS

FIGS. 8A and 8B are diagrams illustrating lens information.

DESCRIPTION OF THE EMBODIMENTS

Hereinafter, embodiments of the present invention will be described in detail using the accompanying drawings. The embodiments to be described below are examples of realization means of the present invention, and may be appropriately modified or changed according to a configuration or various conditions of an apparatus to which the present invention is applied. Further, it is also possible to appropriately combine the respective embodiments.

Embodiment

Figure 1A:
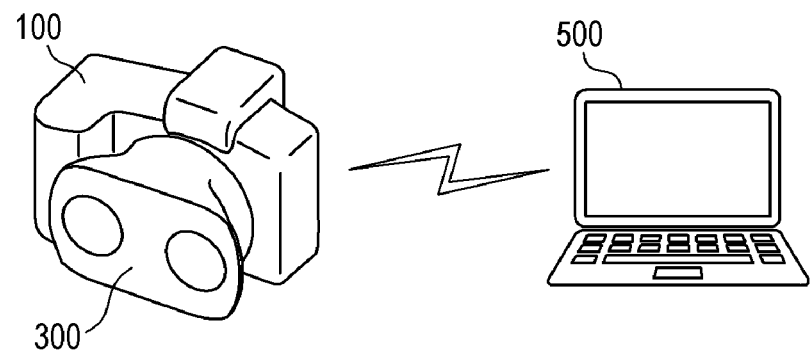
FIGS. 1A and 1B are diagrams illustrating a system.
Figure 1B:
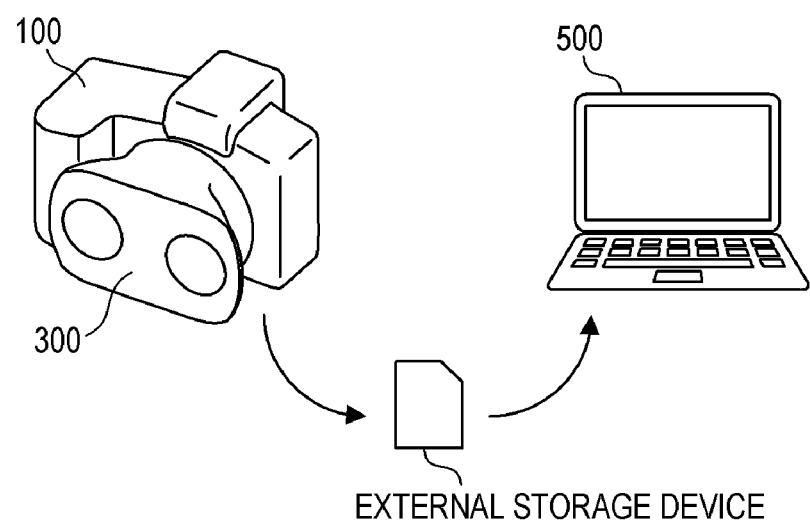

FIGS. 1A and 1B are schematic diagrams illustrating an example of an overall configuration of a system according to the present embodiment. The system according to the present embodiment includes a digital camera (camera) 100 and a personal computer (PC) 500. A lens unit 300 is mounted on (connected) to a camera 100. Although details of the lens unit 300 will be described below, mounting the lens unit 300 enables the camera 100 to simultaneously capture two images (still image or moving image) having a predetermined parallax. The PC 500 is an information processing apparatus (electronic apparatus) that handles images captured by an imaging device such as the camera 100.

FIG. 1A illustrates a configuration in which the camera 100 and the PC 500 are communicatively connected to each other wirelessly or by wire. FIG. 1B illustrates a configuration for inputting an image or the like captured by the camera 100 to the PC 500 via an external storage apparatus on a file basis. The external storage apparatus may or may not be connected to both the camera 100 and the PC 500. For example, the external storage apparatus may be connected to the camera 100, and a file of the image captured by the camera 100 may be stored in the external storage apparatus. Thereafter, the external storage apparatus may be detached from the camera 100 and connected to the PC 500 so that the PC 500 can retrieve the files stored in the external storage apparatus.

Figure 2A:
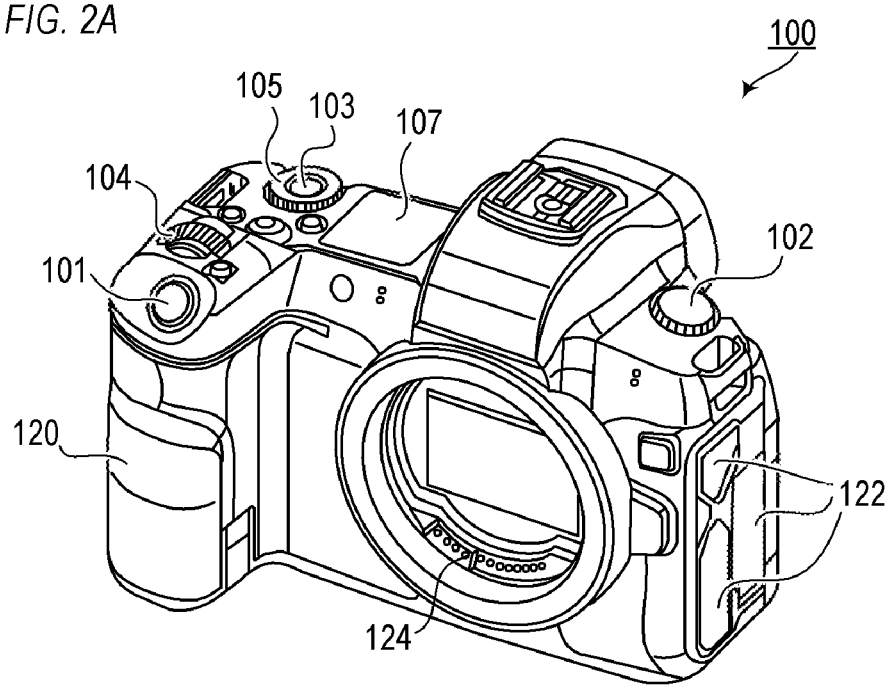
FIGS. 2A and 2B are external views of a camera.
Figure 2B:
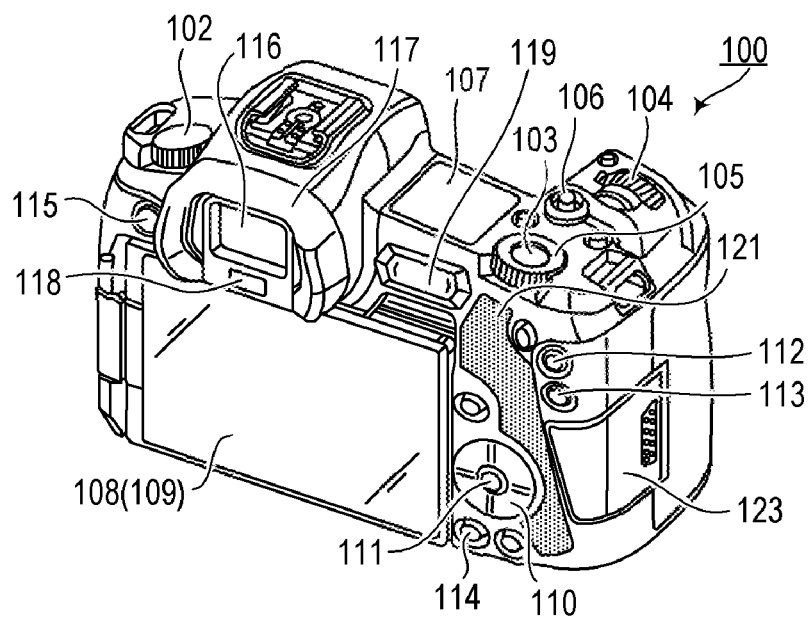

FIGS. 2A and 2B are external views illustrating an example of an external appearance of the camera 100. FIG. 2A is a perspective view of the camera 100 viewed from the front side, and FIG. 2B is a perspective view of the camera 100 viewed from the rear side.

The camera 100 includes a shutter button 101, a power switch 102, a mode changeover switch 103, a main electronic dial 104, a sub-electronic dial 105, a moving image button 106, and a finder outside display unit 107 on its upper surface.

The shutter button 101 is an operation member for instructing photographing preparation or photographing. The power switch 102 is an operation member for switching between power ON and OFF of the camera 100. The mode changeover switch 103 is an operation member for switching between various modes. The main electronic dial 104 is a rotary operation member for changing set values such as a shutter speed or an aperture. The sub-electronic dial 105 is a rotary operation member for performing a movement of a selection frame (cursor), image feed, or the like. The moving image button 106 is an operation member for instructing start or stop of moving image photographing (recording). The finder outside display unit 107 displays various setting values such as the shutter speed or the aperture.

The camera 100 includes a display unit 108, a touch panel 109, a direction key 110, a SET button 111, an AE lock button 112, an enlargement button 113, a playback button 114, a menu button 115, an eyepiece portion 116, an eyepiece detection unit 118, and a touch bar 119 on the back.

The display unit 108 displays images or various types of information. The touch panel 109 is an operation member that detects a touch operation with respect to a display surface (touch operation surface) of the display unit 108. The direction key 110 is an operation unit configured of keys (four-directional keys) that can be pressed up, down, left, and right. The camera 100 is capable of processing according to a pressed position (a position of the direction key 110).

The SET button 111 is an operation member that is mainly pressed when a selection item is determined. The AE lock button 112 is an operation member that is pressed when an exposure state is fixed in a photographing standby state. The enlargement button 113 is an operation member for switching between ON and OFF of the enlargement mode in a live view display (LV display) of a photographing mode. When the enlargement mode is ON, the main electronic dial 104 is operated to enlarge or reduce the live view image (LV image). Further, the enlargement button 113 is used when a reproduced image is enlarged or an enlargement ratio is increased in a playback mode.

The playback button 114 is an operation member for switching between a photographing mode and a playback mode. In the case of the photographing mode, when the playback button 114 is pressed, shift to the playback mode occurs, so that the latest image among images recorded in a recording medium 227 (to be described below) can be displayed on the display unit 108.

The menu button 115 is an operation member that is pressed in order to display a menu screen on which various settings can be made on the display unit 108. The user can intuitively perform various settings using the menu screen displayed on the display unit 108, the direction key 110, or the SET button 111. The eyepiece portion 116 is a portion for looking into an eyepiece finder (a looking-in type finder) 117 through eye contact. The user can visually recognize a video displayed on an electronic view finder (EVF) 217, which will be described below, inside the camera 100 through the eyepiece portion 116. The eyepiece detection unit 118 is a sensor that detects whether or not the user is in contact with the eyepiece portion 116 (the eyepiece finder 117).

The touch bar 119 is a line-shaped touch operation member (line touch sensor) capable of receiving a touch operation. The touch bar 119 is disposed at a position at which the touch bar 119 can be touch-operated with a thumb of a right hand in a state in which a grip portion 120 is gripped with the right hand so that the shutter button 101 can be pressed with an index finger of the right hand (a state in which the grip portion 120 is gripped with a little finger, ring finger, and middle finger of the right hand). That is, the touch bar 119 can be operated in a state (photographing orientation) in which the user comes into eye-contact with the eyepiece finder 117 and looks into the eyepiece portion 116, and is ready to press the shutter button 101 at any time. The touch bar 119 can receive a tap operation with respect to the touch bar 119 (an operation of touching and releasing without a movement of a touch position within a predetermined period), a left/right sliding operation (an operation of moving a touch position while touching after touching), and the like. The touch bar 119 is an operation member different from the touch panel 109 and does not have a display function. The touch bar 119 functions, for example, as a multi-function bar (M-Fn bar) to which various functions can be assigned.

Further, the camera 100 also includes the grip portion 120, a thumb rest portion 121, a terminal cover 122, a lid 123, a communication terminal 124, and the like. The grip portion 120 is a holding portion formed in a shape that allows the user to easily hold the camera 100 with his or her right hand. The shutter button 101 and the main electronic dial 104 are disposed at positions at which the shutter button 101 and the main electronic dial 104 can be operated with the index finger of the right hand in a state in which the camera 100 is being held by gripping the grip portion 120 with the little finger, the ring finger, and the middle finger of the right hand. Further, in the same state, the sub-electronic dial 105 and the touch bar 119 are disposed at positions at which the sub-electronic dial 105 and the touch bar 119 can be operated with a thumb of the right hand. The thumb rest portion 121 (thumb standby position) is a grip portion provided at a place at which it is easy for the thumb of the right hand holding the grip portion 120 to be placed without operating any operation member on the rear side of the camera 100. The thumb rest portion 121 is configured of, for example, a rubber member for enhancing holding power (grip feeling). The terminal cover 122 protects a connector for, for example, a connection cable that connects the camera 100 to an external device (external apparatus). The lid 123 protects the recording medium 227 and the slot by closing a slot for storing the recording medium 227, which will be described below. The communication terminal 124 is a terminal for performing communication with a lens unit (for example, a lens unit 200, a lens unit 300, and the like which will be described below) detachable with respect to the camera 100.

Figure 3:
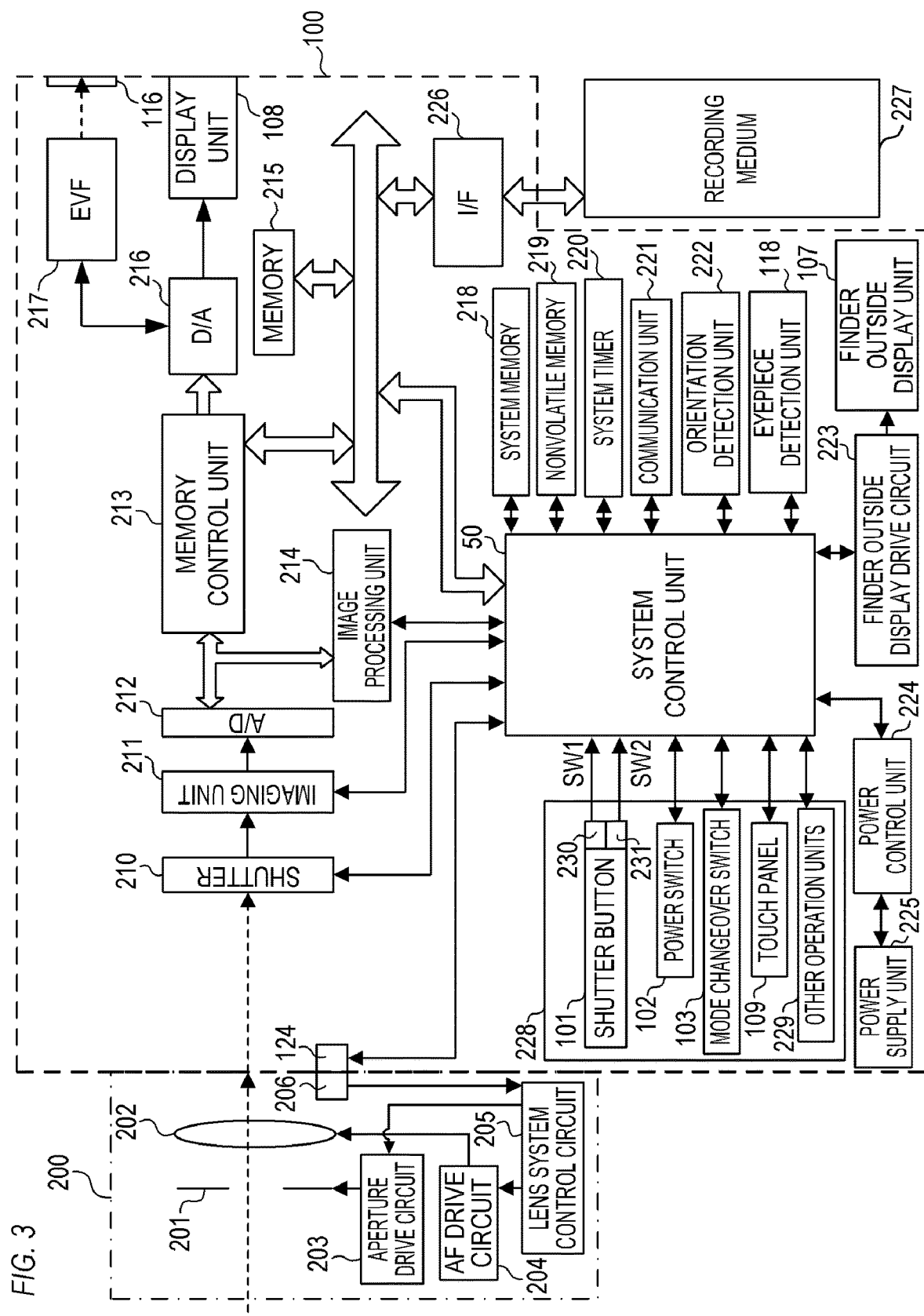
FIG. 3 is a configuration diagram of the camera.

FIG. 3 is a block diagram illustrating an example of a configuration of the camera 100. The same components as in FIGS. 2A and 2B are denoted by the same reference numerals as in FIGS. 2A and 2B, and descriptions of the components are omitted appropriately. In FIG. 3, the lens unit 200 is attached to the camera 100. First, the lens unit 200 will be described. The lens unit 200 is a type of interchangeable lens that can be attached to and detached from the camera 100. The lens unit 200 is a monocular lens and is an example of a normal lens. The lens unit 200 includes an aperture 201, a lens 202, an aperture drive circuit 203, an autofocus (AF) drive circuit 204, a lens system control circuit 205, a communication terminal 206, and the like.

The aperture 201 is configured so that an aperture diameter can be adjusted. The lens 202 is configured of a plurality of lenses. The aperture drive circuit 203 adjusts an amount of light by controlling the aperture diameter of the aperture 201. An AF drive circuit 204 drives the lens 202 for focusing. The lens system control circuit 205 controls the aperture drive circuit 203, the AF drive circuit 204, and the like on the basis of an instruction from a system control unit 50, which will be described below. The lens system control circuit 205 performs control of the aperture 201 through the aperture drive circuit 203 and changes a position of the lens 202 through the AF drive circuit 204 for focusing. The lens system control circuit 205 can communicate with the camera 100. Specifically, communication is performed via the communication terminal 206 of the lens unit 200 and the communication terminal 124 of the camera 100. The communication terminal 206 is a terminal for the lens unit 200 communicating with the camera 100.

Next, the camera 100 will be described. The camera 100 includes a shutter 210, an imaging unit 211, an A/D converter 212, a memory control unit 213, an image processing unit 214, a memory 215, a D/A converter 216, an EVF 217, the display unit 108, and the system control unit 50.

The shutter 210 is a focal plane shutter that can freely control an exposure time of the imaging unit 211 on the basis of an instruction from the system control unit 50. The imaging unit 211 is an imaging device (image sensor) configured of, for example, a CCD or a CMOS device that converts an optical image into an electrical signal. The imaging unit 211 may include an imaging surface phase difference sensor that outputs a defocus amount information to the system control unit 50. The A/D converter 212 converts an analog signal output from the imaging unit 211 into a digital signal. The image processing unit 214 performs predetermined processing (pixel interpolation, resizing processing such as reduction, color conversion processing, or the like) on the data from the A/D converter 212 or the data from the memory control unit 213. Further, the image processing unit 214 performs predetermined calculation processing using captured image data, and the system control unit 50 performs exposure control or distance measurement control on the basis of the obtained calculation result. Through this processing, through-the-lens (TTL) AF processing, auto exposure (AE) processing, flash pre-emission (EF) processing, and the like are performed. Further, the image processing unit 214 performs predetermined calculation processing using the captured image data, and the system control unit 50 performs TTL auto white balance (AWB) processing on the basis of the obtained calculation result.

The image data from the A/D converter 212 is written into the memory 215 via the image processing unit 214 and the memory control unit 213. Alternatively, the image data from the A/D converter 212 is written to the memory 215 via the memory control unit 213 without passing through the image processing unit 214. The memory 215 stores image data obtained by the imaging unit 211 and converted into digital data by the A/D converter 212, and image data to be displayed on the display unit 108 or the EVF 217. The memory 215 has a storage capacity sufficient to store a predetermined number of still images, moving images and audio for a predetermined time. Further, the memory 215 also serves as an image display memory (video memory).

The D/A converter 216 converts the image data for display stored in the memory 215 into an analog signal and supplies the analog signal to the display unit 108 or the EVF 217. Therefore, the image data for display written to the memory 215 is displayed on the display unit 108 or the EVF 217 via the D/A converter 216. The display unit 108 or the EVF 217 performs display according to the analog signal from the D/A converter 216. The display unit 108 or the EVF 217 is a display such as an LCD or an organic EL, for example. A digital signal A/D converted by the A/D converter 212 and accumulated in the memory 215 is converted into an analog signal by the D/A converter 216 and sequentially transferred to the display unit 108 or the EVF 217 for display, so that a live view display is performed.

The system control unit 50 is a control unit including at least one processor and/or at least one circuit. That is, the system control unit 50 may be a processor, may be a circuit, or may be a combination of the processor and the circuit. The system control unit 50 controls the entire camera 100. The system control unit 50 executes a program recorded in a nonvolatile memory 219 to realize each processing of the flowchart to be described below. The system control unit 50 also performs display control by controlling the memory 215, the D/A converter 216, the display unit 108, the EVF 217, and the like.

Further, the camera 100 includes a system memory 218, a nonvolatile memory 219, a system timer 220, a communication unit 221, an orientation detection unit 222, and the eyepiece detection unit 118.

A RAM, for example, is used as the system memory 218. In the system memory 218, constants and variables for an operation of the system control unit 50, a program read from the nonvolatile memory 219, and the like are developed. The nonvolatile memory 219 is an electrically erasable and recordable memory, and an EEPROM, for example, is used as the nonvolatile memory 219. In the nonvolatile memory 219, constants, programs, and the like for an operation of the system control unit 50 are recorded. The program here is a program for executing a flowchart to be described below.

The system timer 220 is a timing unit that measures a time used for various controls or a time of a built-in clock. The communication unit 221 performs transmission and reception of a video signal or an audio signal to and from an external device connected wirelessly or by a wired cable.

The communication unit 221 can be connected to a wireless local area network (LAN) or the Internet. Further, the communication unit 221 can communicate with the external device using Bluetooth (registered trademark) or Bluetooth Low Energy. The communication unit 221 can transmit the image (including a live image) captured by the imaging unit 211 or the image recorded in the recording medium 227, and can receive an image or various types of other information from the external device.

The orientation detection unit 222 detects the orientation of the camera 100 with respect to a direction of gravity. Whether the image captured by the imaging unit 211 is an image captured with the camera 100 held horizontally or an image captured with the camera 100 held vertically can be determined on the basis of the orientation detected by the orientation detection unit 222. The system control unit 50 can add orientation information according to the orientation detected by the orientation detection unit 222 to the image file of the image captured by the imaging unit 211, and rotate the image according to the detected orientation. For the orientation detection unit 222, for example, an acceleration sensor, a gyro sensor, or the like can be used. The orientation detection unit 222 can also be used to detect a motion of the camera 100 (pan, tilt, lift, stop, or the like).

The eyepiece detection unit 118 can detect the approach of any object to the eyepiece portion 116 (the eyepiece finder 117). An infrared proximity sensor, for example, can be used for the eyepiece detection unit 118. When an object approaches, infrared rays projected from a light projection unit of the eyepiece detection unit 118 are reflected by the object and received by a light reception unit of the infrared proximity sensor. The distance from the eyepiece portion 116 to the object can be determined by the amount of received infrared rays. Thus, the eyepiece detection unit 118 performs eyepiece detection for detecting a proximity distance of the object to the eyepiece portion 116.

The eyepiece detection unit 118 is an eyepiece detection sensor that detects approach (eye contact) and separation (eye separation) of an eye (object) with respect to the eyepiece portion 116. When an object approaching within a predetermined distance from the eyepiece portion 116 is detected from a non-eye contact state (non-approach state), the eyepiece is detected. On the other hand, when the object whose approach has been detected moves away from the eye contact state (approach state) by a predetermined distance or more, the eye separation is detected. A threshold value for detection eyepiece and a threshold value for detection of the eye separation may be different, for example, by providing hysteresis. Further, it is assumed that after the eyepiece is detected, an eye contact state is maintained until the eye separation is detected. It is assumed that after the eye separation is detected, the contact is the non-eye contact state until the eye contact is detected. The system control unit 50 switches between display (display state) and non-display (non-display state) of the display unit 108 or the EVF 217 according to the state detected by the eyepiece detection unit 118. Specifically, at least in the photographing standby state and when a switching setting of a display destination is automatic switching, the display destination is set to the display unit 108, the display is turned on, and a display of the EVF 217 is turned OFF during the non-eye contact. Further, in the eye contact state, the display destination is the EVF 217, the display is turned on, and the display unit 108 is turned off. The eyepiece detection unit 118 is not limited to the infrared proximity sensor, and other sensors can be used as the eyepiece detection unit 118 as long as the sensors can detect a state that can be regarded as eyepiece. The camera 100 also includes the finder outside display unit 107, a finder outside display drive circuit 223, a power control unit 224, a power supply unit 225, a recording medium I/F 226, an operation unit 228, and the like.

The finder outside display unit 107 is driven by the finder outside display drive circuit 223, and displays various setting values of the camera 100, such as the shutter speed or the aperture. The power control unit 224 includes a battery detection circuit, a DC-DC converter, a switch circuit that switches a block to be energized, and the like. The power control unit 224 detects whether or not a battery is mounted, a type of battery, a remaining battery level, and the like. Further, the power control unit 224 controls the DC-DC converter on the basis of a result of the detection and an instruction from the system control unit 50, and supplies a necessary voltage to each unit including the recording medium 227 for a necessary period. The power supply unit 225 is a primary battery (an alkaline battery, lithium battery, or the like), a secondary battery (a NiCd battery, NiMH battery, Li battery, or the like), an AC adapter, or the like. The recording medium I/F 226 is an interface with the recording medium 227 such as a memory card or hard disk. The recording medium 227 is, for example, a memory card for recording captured images, and is configured of a semiconductor memory, a magnetic disk, or the like. The recording medium 227 may be detachable from the camera 100 or may be built in the camera 100.

The operation unit 228 is an input unit that receives operations from the user (user operations), and is used to input various instructions to the system control unit 50. The operation unit 228 includes, for example, the shutter button 101, the power switch 102, the mode changeover switch 103, the touch panel 109, and other operation units 229. The other operation units 229 include, for example, the main electronic dial 104, the sub-electronic dial 105, the moving image button 106, the direction keys 110, the SET button 111, the AE lock button 112, the enlargement button 113, the playback button 114, the menu button 115, the touch bar 119.

The shutter button 101 includes a first shutter switch 230 and a second shutter switch 231. The first shutter switch 230 is turned on by so-called half-pressing during an operation of the shutter button 101 (photographing preparation instruction), and outputs a first shutter switch signal SW1. The system control unit 50 starts photographing preparation processing such as AF processing, AE processing, AWB processing, and EF processing according to the output of the first shutter switch signal SW1. The second shutter switch 231 is turned on when the operation of the shutter button 101 is completed, that is, when the shutter button 101 is fully pressed (photographing instruction), and outputs a second shutter switch signal SW2. In response to the output of the second shutter switch signal SW2, the system control unit 50 starts a series of photographing processes (processing from signal reading from the imaging unit 211 to generation of an image file including the captured image and writing the image file to the recording medium 227).

The mode changeover switch 103 switches an operation mode of the system control unit 50 to any one of a still image photographing mode, a moving image photographing mode, a playback mode, and the like. Modes included in the still image photographing mode include an auto photographing mode, an auto scene determination mode, a manual mode, an aperture priority mode (Av mode), a shutter speed priority mode (Tv mode), and a program AE mode (P mode). Further, there are various scene modes, custom modes, or the like, which are photographing settings for each photographing scene. The user can directly switch to one of the above-described photographing modes by using the mode changeover switch 103. Alternatively, the user can use the operation unit 228 to selectively switch to one of the plurality of displayed modes after temporarily switching to a photographing mode list screen using the mode changeover switch 103. Similarly, the moving image photographing mode may also include a plurality of modes.

The touch panel 109 is a touch sensor that detects various touch operations with respect to the display surface of the display unit 108 (an operation surface of the touch panel 109). The touch panel 109 and the display unit 108 can be configured integrally. For example, the touch panel 109 is attached to an upper layer of the display surface of the display unit 108 so that a light transmittance does not interfere with a display of the display unit 108. A graphical user interface (GUI) can be configured so that the user can directly operate a screen displayed on the display unit 108 by associating input coordinates in the touch panel 109 with display coordinates on the display surface of the display unit 108. For the touch panel 109, any one of various schemes such as a resistive film scheme, a capacitance scheme, a surface acoustic wave scheme, an infrared scheme, an electromagnetic induction scheme, an image recognition scheme, and an optical sensor scheme can be used. The scheme may include a scheme in which touch is detected when there is contact with the touch panel 109, and a scheme in which a touch is detected when a finger or pen approaches the touch panel 109, but any of the schemes may be used.

The system control unit 50 can detect the following operations or states with respect to the touch panel 109.

The touch panel 109 is newly touched with a finger or pen that has not touched the touch panel 109, that is, start of touch (hereinafter referred to as touch-down).

A state in which the touch panel 109 is touched with a finger or a pen (hereinafter referred to as touch-on).

The touch panel 109 is moved while being touched by a finger or pen (hereinafter referred to as touch-move).

The finger or pen touching the touch panel 109 is released from the touch panel 109, that is, end of the touch (hereinafter referred to as touch-up).

A state in which a touch is not performed on the touch panel 109 (hereinafter referred to as touch-off).

When a touch-down is detected, a touch-on is also detected at the same time. After the touch-down, touch-on normally continues to be detected unless touch-up is detected. Touch-on is detected at the same time when touch-move is detected. Even when the touch-on is detected, the touch-move is not detected when the touch position does not move. After touch-up of all fingers or a pen that have touched is detected, touch-off is made.

The system control unit 50 is notified of these operations or states and position coordinates at which the finger or pen touches the touch panel 109 via an internal bus. The system control unit 50 determines which of operations (touch operation) has been performed on the touch panel 109 on the basis of the notified information. For the touch-move, a moving direction of the finger or pen moving on the touch panel 109 can also be determined for each vertical component or horizontal component on the touch panel 109 on the basis of change in position coordinates. When the touch-move of a predetermined distance or more is detected, a determination is made that the slide operation has been performed. An operation of quickly moving by a certain distance and then releasing while touching the touch panel 109 with a finger is called a flick. The flick is, in other words, an operation of quickly tracing the touch panel 109 as if flicking a finger. It is detected that a touch-move has been performed for a predetermined distance or more at a predetermined speed or more, and when a touch-up is detected as it is, a determination is made that a flick has been performed (a determination can be made that the flick has occurred following the slide operation). Further, a touch operation in which a plurality of locations (for example, two points) are touched together (multi-touch) and touch positions are brought closer is called pinch-in, and a touch operation in which touch position are moved away from each other is called pinch-out. The pinch-out and the pinch-in are collectively called a pinch operation (or simply pinch).

Figure 4:
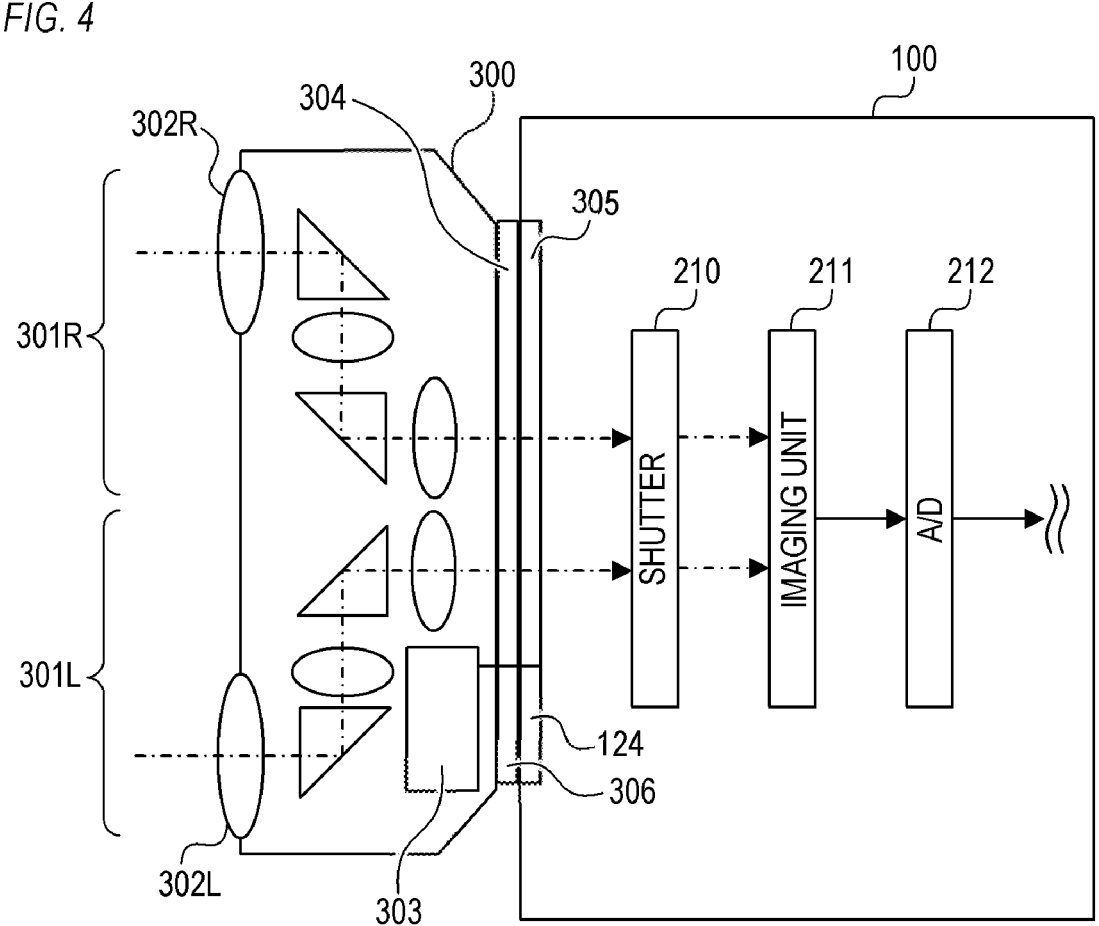
FIG. 4 is a diagram illustrating a configuration of a lens unit.

FIG. 4 is a schematic diagram illustrating an example of a configuration of the lens unit 300. In FIG. 4, a state in which the lens unit 300 is mounted on the camera 100 is illustrated. In the camera 100 illustrated in FIG. 4, the same components as those described in FIG. 3 are denoted by the same reference numerals as in FIG. 3, and description of the components is omitted appropriately.

The lens unit 300 is a kind of interchangeable lens that can be attached to and detached from the camera 100. The lens unit 300 is a dual lens capable of imaging a right image and a left image having a predetermined parallax with each other. In the present embodiment, the lens unit 300 includes two optical systems, and a range at a wide viewing angle of approximately 180 degrees can be imaged with each of the two optical systems. Specifically, in each of the two optical systems of the lens unit 300, an object corresponding to 180 degrees in a left-right direction (a horizontal angle, azimuth angle, and yaw angle) and 180 degrees in an up-down direction (a vertical angle, elevation or depression angle, and a pitch angle) can be imaged. That is, a range of a forward hemisphere can be imaged by each of the two optical systems.

The lens unit 300 includes a right-eye optical system 301R having a plurality of lenses and reflective mirrors, a left-eye optical system 301L having a plurality of lenses and reflective mirrors, and a lens system control circuit 303. The right-eye optical system 301R is an example of a first optical system, and the left-eye optical system 301L is an example of a second optical system. The right-eye optical system 301R includes a lens 302R disposed on the object side, and the left-eye optical system 301L includes a lens 302L disposed on the object side. The lens 302R and the lens 302L face the same direction, and optical axes thereof are substantially parallel.

The lens unit 300 is a dual lens (VR180 lens) for obtaining a VR180 image, which is one of virtual reality (VR) image formats capable of dual-lens stereoscopic viewing. In the present embodiment, in the lens unit 300, each of the right-eye optical system 301R and the left-eye optical system 301L includes a fisheye lens capable of capturing a range of approximately 180 degrees. A range that can be captured by the lenses of the right-eye optical system 301R and the left-eye optical system 301L may be about 160 degrees, which is narrower than a range of 180 degrees. The lens unit 300 can form a right image (first image) formed via the right-eye optical system 301R and a left image (second image) formed via the left-eye optical system 301L on one or two imaging devices of the camera having the lens unit 300 mounted thereon.

The lens unit 300 is mounted on the camera 100 via a lens mount unit 304 and a camera mount unit 305 of the camera 100. By doing so, the system control unit 50 of the camera 100 and the lens system control circuit 303 of the lens unit 300 are electrically connected via the communication terminal 124 of the camera 100 and the communication terminal 306 of the lens unit 300.

In the present embodiment, a right image formed via the right-eye optical system 301R and a left image formed via the left-eye optical system 301L are simultaneously (as a set) formed on the imaging unit 211 of the camera 100. That is, two optical images formed by the right-eye optical system 301R and the left-eye optical system 301L are formed on one imaging device. The imaging unit 211 converts the formed object image (optical signal) into an analog electrical signal. Using the lens unit 300 in this way enables two images with parallax to be simultaneously acquired (as a set) from two locations (optical systems) of the right-eye optical system 301R and the left-eye optical system 301L. The acquired image is divided into an image for a left eye and an image for a right eye and is subjected to a VR display, making it possible for the user to view a stereoscopic VR image in a range of approximately 180 degrees. That is, the user can stereoscopically view the image of the VR180.

Here, the VR image is an image that can be subjected to VR display, which will be described below. The VR image includes, for example, an omnidirectional image (an spherical image) captured by an omnidirectional camera (a spherical camera), or a panoramic image with a wider image range (effective image range) than a display range that can be displayed on the display unit at one time, and the like. Further, the VR image is not limited to a still image, and also includes a moving image, and a live image (an image acquired in substantially real time from a camera). Further, the VR image has a maximum video range (effective video range) of 360 degrees in a left-right direction and 360 degrees in an up-down direction. Further, even when the video range is less than 360 degrees in the left-right direction and less than 360 degrees in the up-down direction, an image with an angle of view wider than an angle of view with which imaging can be performed by a normal camera, or a video range wider than a display range in which display can be performed at one time on the display unit is also included in the VR image. The image captured by the camera 100 using the lens unit 300 described above is a type of VR image. The VR image can be subjected to the VR display, for example, by setting a display mode of a display apparatus (a display apparatus capable of displaying a VR image) to "VR view". Subjecting the VR image having an angle of view of 360 degrees to the VR display and the user changing an orientation of the display apparatus in a left-right direction (horizontal rotation direction), making it possible to enjoy a seamless omnidirectional video in the left-right direction.

The VR display (VR view) is a display method (display mode) that allows the display range to be changed to display a video in a view range according to the orientation of the display apparatus in the VR image. The VR display includes a "single-lens VR display (single-lens VR view)" in which one image is displayed by performing deformation (distortion correction) for mapping the VR image onto a virtual sphere. Further, the VR display includes a "dual-lens VR display (dual-lens VR view)" in which deformation for mapping a VR image for a left eye and a VR image for a right eye onto a virtual sphere is performed and the images are displayed side by side in left and right areas. Performing "dual-lens VR display" using the VR image for the left eye and the VR image for the right eye having parallax makes it possible to stereoscopically view these VR images.

In any VR display, for example, when the user wears a display apparatus such as a head-mounted display (HMD), a video in a view field according to an orientation of a face of the user is displayed. For example, a video in a view range centered at 0 degrees in a left-right direction (a specific direction, such as north) and 90 degrees in an up-down direction (90 degrees from a zenith, that is, horizontal) at a certain point in time in the VR image is displayed. When the orientation of the display apparatus is reversed from this state (for example, the display surface is changed from a south orientation to a north orientation), a display range in the same VR image is changed into a video in a view range centered at 180 degrees in the left-right direction (opposite direction, such as south) and degrees in an up-down direction. That is, when the user wears the HMD and turns his face from north to south (that is, turns his back), the video displayed on the HMD is changed from a north video to a south video. The VR image captured using the lens unit 300 of the embodiment is an image (180° image) captured in a range of approximately 180 degrees forward, and there is no video in a range of approximately 180 degrees backward. When such an image is subjected to the VR display and the orientation of the display apparatus is changed to the side in which there is no video, a blank area is displayed.

The VR image is subjected to the VR display in this way, making it possible for the user to visually feel as if the user is inside the VR image (inside a VR space) (feel immersion). A method of displaying the VR image is not limited to a method of changing the orientation of the display apparatus. For example, the display range may be moved (scrolled) according to a user operation via a touch panel, direction buttons, or the like. Further, at the time of VR display (at the time of the display mode "VR view"), the display range can be changed depending on touch-move on the touch panel, a drag operation with respect to a mouse, or the like, pressing of the direction buttons, or the like, in addition to changing the display range according to orientation change. A smartphone mounted on a VR goggle (a head mount adapter) is a kind of HMD.

Figure 5:
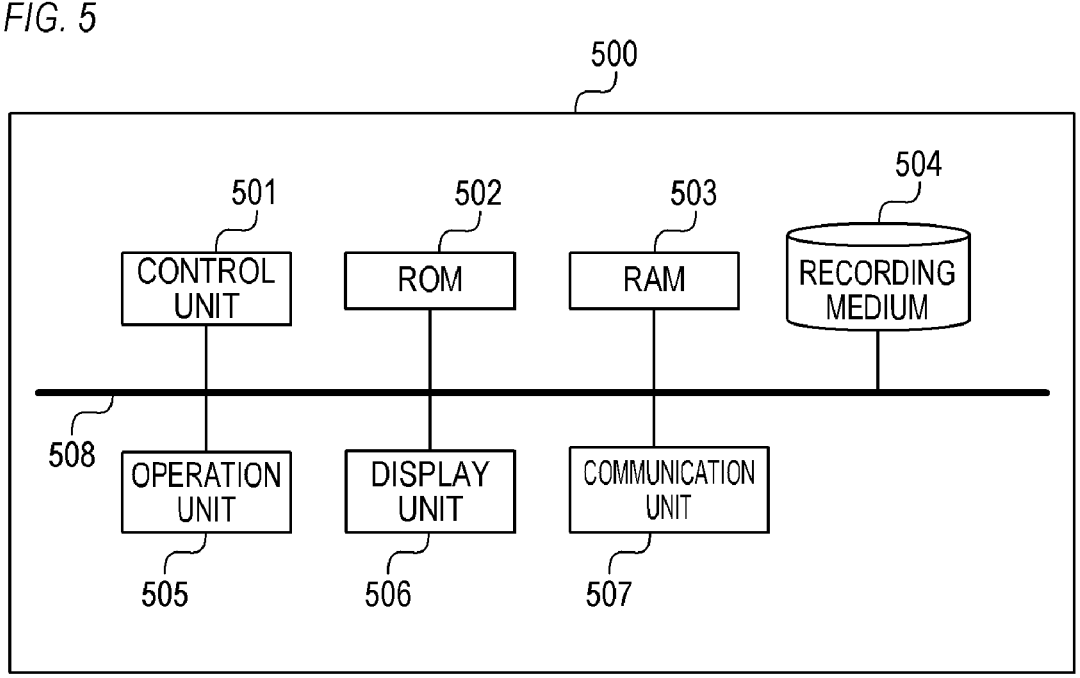
FIG. 5 is a hardware configuration diagram of a PC.

FIG. 5 is a block diagram illustrating an example of a configuration of the PC 500. The control unit 501 is, for example, a central processing unit (CPU), and controls the PC 500 as a whole. A read only memory (ROM) 502 non-temporarily stores programs or parameters. A random access memory (RAM) 503 temporarily stores programs or data supplied from an external device or the like. The recording medium 504 is a hard disk or flash memory fixedly installed in the PC 500, or an optical disc, magnetic card, optical card, IC card, memory card, or the like that is removable from the PC 500. A file of an image captured by the camera 100 is read from the recording medium 504.

An operation unit 505 receives user operations with respect to the PC 500. An operation member used when the user performs an operation may be a button or a touch panel provided on the PC 500, or may be a keyboard, mouse, or the like that is detachable from the PC 500. A display unit 506 displays data held by the PC 500, data supplied from the outside, and the like. The display unit 506 may be a part of the PC 500 or may be a display apparatus separate from the PC 500. A communication unit 507 communicates with an external device such as the camera 100. A system bus 508 communicatively connects components of the PC 500.

Here, features of an image captured with the mounted lens unit 300 (dual lens) will be described. In the case of the lens unit 200 (ordinary single-lens), an image inverted vertically and horizontally with respect to the actual appearance (an image rotated 180 degrees) is formed on the imaging unit 211. Therefore, the entire formed image is rotated by 180 degrees to acquire (capture) an image that matches the actual appearance. On the other hand, in the case of the lens unit 300 (dual lens), the right image and the left image are formed on the imaging unit 211 after being rotated 180 degrees with respect to the actual appearance. The arrangement of the right image and the left image is not particularly limited, but in the present embodiment, it is assumed that the right image is formed on the right side and the left image is formed on the left side on the imaging unit 211. As in the case of the lens unit 200 (ordinary single-lens), when the entire formed image (an image including the right image and the left image) is rotated 180 degrees, the right image and the left image can appear as the actual appearance, but positions of the right image and the left image are switched. That is, a left and right positional relationship is reversed, and an image in which the right image is arranged on the left side and the left image is arranged on the right side is captured.

Figure 6:
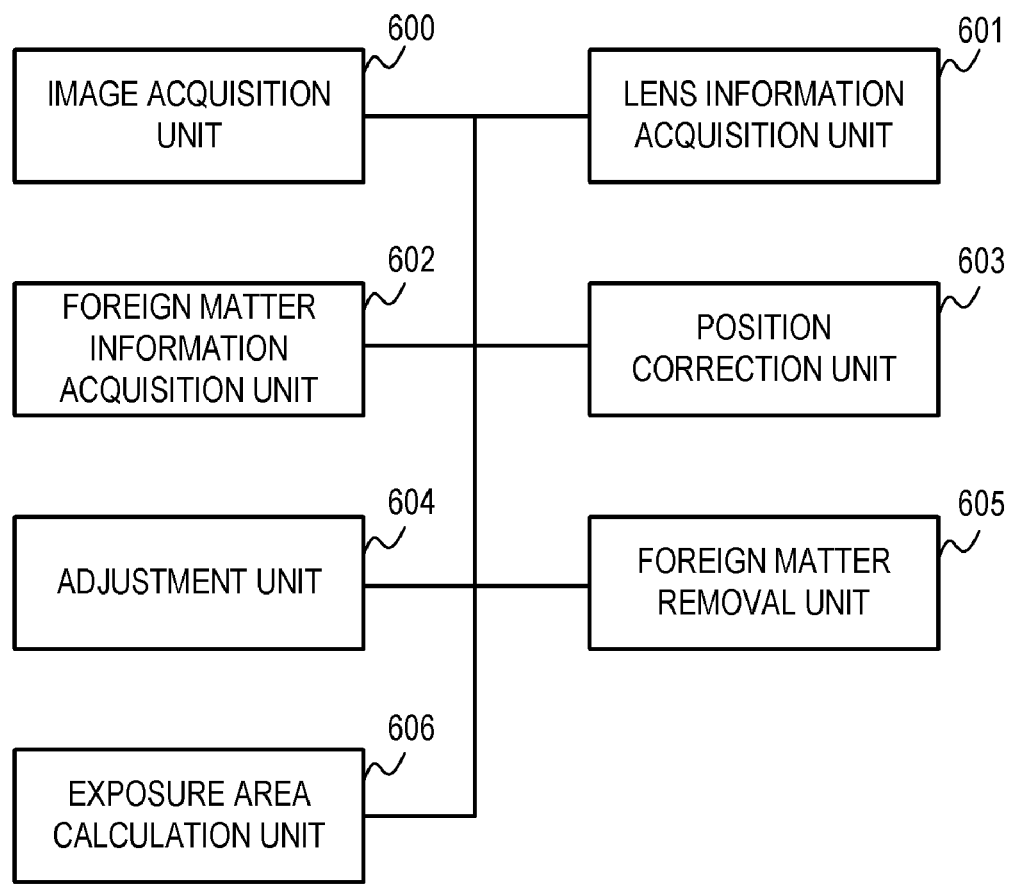
FIG. 6 is a software configuration diagram of the PC.

FIG. 6 is a diagram illustrating a software configuration (logical configuration) of the PC 500. Each configuration illustrated in FIG. 6 is realized by the control unit 501 loading, for example, a predetermined program stored in the ROM 502 into the RAM 503 and executing the predetermined program. Specifically, the control unit 501 operates as each component according to the predetermined program. That is, the control unit 501 operates as an image acquisition unit 600, a lens information acquisition unit 601, a foreign matter information acquisition unit 602, a position correction unit 603, an adjustment unit 604, a foreign matter removal unit 605, and an exposure area calculation unit 606.

Image Acquisition Unit 600

Figure 7:
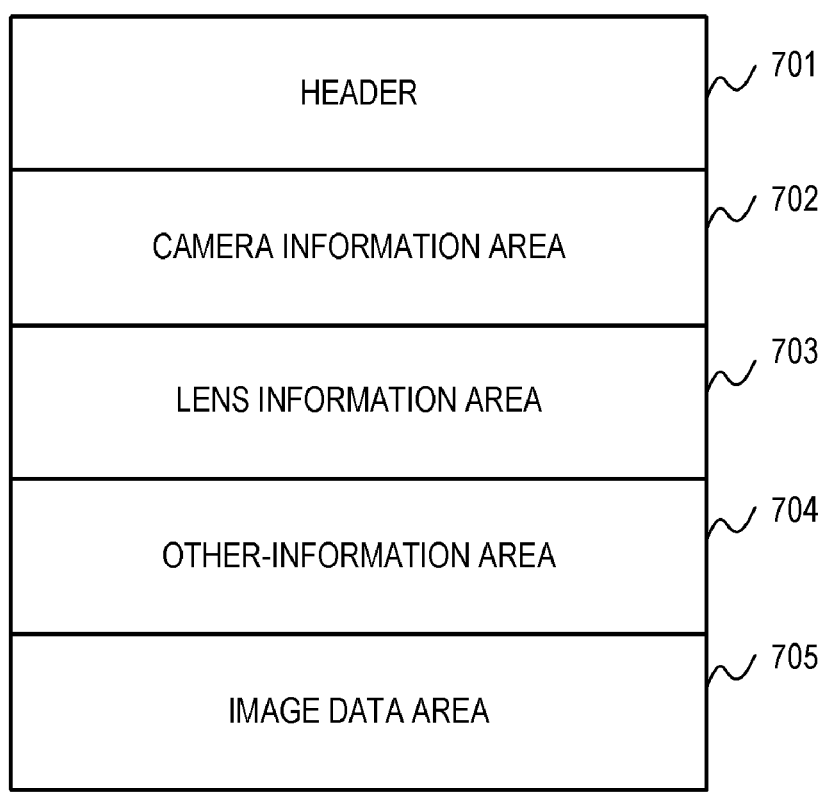
FIG. 7 is a diagram illustrating an image file.

The image acquisition unit 600 reads the image file stored in the recording medium 504. FIG. 7 is a schematic diagram illustrating an example of a structure of the image file. The image file illustrated in FIG. 7 includes a header 701, a camera information area 702, a lens information area 703, an other-information area 704, and image data area 705.

In the header 701, information such as a type of image (captured image) obtained by imaging (photographing) the object (for example, whether the captured image is a moving image or a still image) is recorded.

In the camera information area 702, information of the camera used for imaging (photographing) is recorded as metadata of the captured image. For example, in the camera information area 702, imaging information (for example, the shutter speed or the aperture at the time of imaging), orientation information of the camera at the time of imaging, and the like are recorded.

In the lens information area 703, information on the lens used for imaging (photographing) is recorded as the metadata of the captured image. In the lens information area 703, for example, a design value or an individual value (a deviation value from the design value) of the dual lens used for imaging is recorded.

In the other-information area 704, other information is recorded as the metadata of the captured image. In the other-information area 704, for example, foreign matter information indicating coordinates of a foreign matter adhered to an imaging device (an imaging sensor; a lens) is recorded. The control unit 501 or the system control unit 50, for example, can determine the coordinates of the foreign matter on the basis of an image by the imaging unit 211 imaging a white paper in advance (that is, determine coordinates of an area other than a white area to be the coordinates of the foreign matter). Further, when the captured image is a moving image, information that changes for each frame is recorded in the other-information area 704. When the captured image is a RAW image, data necessary for development is recorded in the other-information area 704.

The image data of the captured image is recorded in the image data area 705. When a moving image is recorded as the captured image in the image data area 705, not only the image data but also the audio data is recorded in the image data area 705.

An example in which camera information, dual lens information, and other information are recorded in one image file has been shown above. However, these pieces of information may be recorded in a file separate from the image file (a file associated with the image file).

Lens Information Acquisition Unit 601

The lens information acquisition unit 601 acquires lens information from the lens information area in the image file. FIG. 8A is a schematic diagram illustrating an example of the lens information. The lens information includes a lens design value, a lens individual value, a lens flag, a lens focal length, a lens temperature, and the like.

The lens design value is a design value for performing aberration correction. In a dual lens manufacturing process, an error (aberration) of lens eccentricity, tilt, or the like occur in each of the two optical systems (the left-eye optical system 301L and the right-eye optical system 301R). When the left and right areas are switched or equirectangular conversion is performed without considering this error, the quality (grade) of the dual-lens VR display is degraded. In this case, it becomes difficult for the user to perform good stereoscopic vision.

The lens individual value is, for example, a measurement result of a deviation (error) from the design value detected in a dual lens manufacturing process. Details of the lens design value and the lens individual value will be described below with reference to FIG. 8B.

The lens flag is a flag indicating whether or not the lens used for imaging is a dual lens. The lens flag can be used for a determination as to whether or not the dual lens has been used when capturing of the captured image is performed.

The lens focal length is a distance between the "principal point" that is a center of the lens, and the imaging device (image forming position). The lens focal length may or may not be a parameter common to the two optical systems (the left eye optical system 301L and the right eye optical system 301R) of the dual lens. In order to perform high-quality dual lens VR display, it is necessary to perform left-right switching, equirectangular conversion, and the like with high accuracy, and thus, a highly accurate lens focal length is required.

The lens temperature is a temperature of the dual lens, and is used to ascertain an environmental temperature at the time of imaging (at the time of photographing).

FIG. 8B is a schematic diagram illustrating details of the lens design value and the lens individual values. In the present embodiment, the lens design value and the lens individual value are used for switching of the areas of the left image and the right image in the captured image, adjustment of foreign matter information, and the like.

The lens design value includes an image circle position, an image circle diameter, an angle of view, and a distortion correction coefficient.

The image circle position is an optical axis center coordinates of the optical system in the captured image, and is prepared for each of the two optical systems of the dual lens (the left eye optical system 301L and the right eye optical system 301R). That is, the image circle position is center coordinates of an image circle (circumferential fisheye image) formed on the imaging device, and is prepared for each of the right image and the left image. An origin of the coordinates is, for example, a center of the imaging device (a center of the captured image). The image circle position includes coordinates in the horizontal direction and coordinates in the vertical direction. Various types of information on the optical axis center of the optical system in the captured image may be used as the image circle position. For example, a distance from a predetermined position (a center, an upper left corner, or the like) in the captured image to the optical axis center can be used as the image circle position.

The image circle diameter is a diameter of the image circle (circumferential fisheye image) formed on the imaging device. The angle of view is an angle of view (range) of the image circle (circumferential fisheye image) formed on the imaging device. The distortion correction coefficient is a ratio of a designed image height to an ideal image height of the lens. The distortion correction coefficient may be set for each image height, and the distortion correction coefficient may be calculated by interpolation calculation using a plurality of distortion correction coefficients, for an image height for which the distortion correction coefficient is not set. A polynomial that approximates a relationship between the image height and the distortion correction coefficient may be set.

The image circle diameter, the angle of view, and the distortion correction coefficient may or may not be common parameters in the two optical systems of the dual lens (the left eye optical system 301L and the right eye optical system 301R).

The lens individual value includes an image circle position deviation, an optical axis tilt, an image magnification deviation, and the like. These pieces of information are prepared by performing measurement on each of the two optical systems (the left-eye optical system 301L and the right-eye optical system 301R) of the dual lens.

The image circle position deviation is a deviation of the center coordinates of the image circle (circumferential fisheye image) formed on the imaging device from the design value. For example, the image circle position deviation includes a deviation in a horizontal direction and a deviation in a vertical direction. With coordinate of the design value (two-dimensional coordinates including the coordinates in the horizontal direction and the coordinates in the vertical direction) as an origin, the deviation in the horizontal direction is indicated by coordinates in the horizontal direction, and the deviation in the vertical direction is indicated by coordinates in the vertical direction. The optical axis tilt is a deviation of an orientation of an optical axis on the object side from the design value. For example, the optical axis tilt includes the deviation in the horizontal direction and the deviation in the vertical direction. The deviation in each direction is indicated in degrees. The image magnification deviation is a deviation of a size of the image circle (circumferential fisheye image) formed on the imaging device from the design value. This deviation is indicated, for example, as a ratio to the design value.

Foreign Matter Information Acquisition Unit 602

Figure 9A:
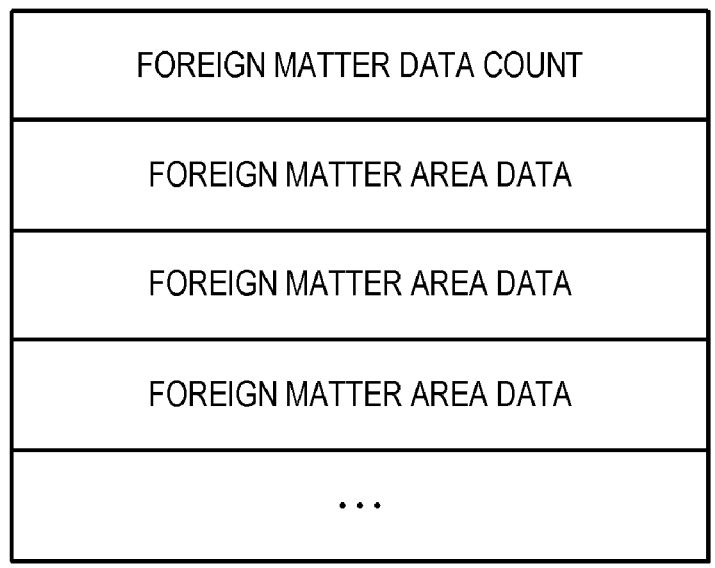
FIGS. 9A and 9B are diagrams illustrating foreign matter information.

The foreign matter information acquisition unit 602 acquires the foreign matter information from the other-information area. FIG. 9A is a schematic diagram illustrating an example of the foreign matter information acquired by the foreign matter information acquisition unit 602. The foreign matter information includes a foreign matter data count and foreign matter area data for each foreign matter.

Figure 9B:
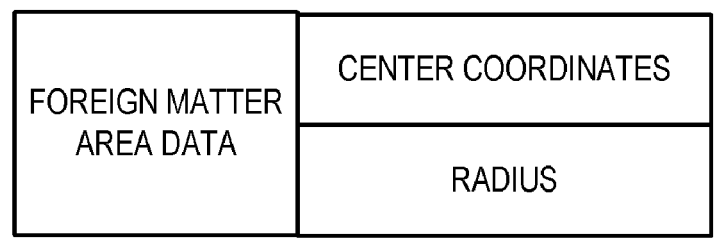

The foreign matter data count indicates the number of pieces of foreign matter area data included in the foreign matter information. As illustrated in FIG. 9B, each piece of foreign matter area data includes information such as center coordinates and a radius of a circular area including the foreign matter. The circular area defined by the center coordinates and the radius is a foreign matter area, which is an area including the foreign matter.

Position Correction Unit 603

The position correction unit 603 corrects the positions of the right image area and the left image area (the positions of the two optical images) in the captured image captured by the dual lens to correspond to the two optical systems (right eye optical system 301R and the left eye optical system 301L) on the basis of the lens information.

Correction processing of the positions of the right image area and the left image area will be described below with reference to FIG. 10. First, the position correction unit 603 acquires a width WA of the captured image before correction (pre-correction image), and acquires a width WL of the left image and a width WR of the right image on the basis of the angle of view recorded in the lens information. In this case, it is assumed that WA=WL+WR is established. When an upper left corner of the captured image is an origin (0, 0) of the coordinates, $X_B$=WR is established for an X coordinate $X_B$ of a boundary line B between the right image area and the left image area.

For the coordinates (X,Y) of the pixel in the pre-correction image, when $X<X_B$, the pixel is included in the right image in the pre-correction image. For this reason, the position correction unit 603 moves the pixel arranged at the coordinates (X,Y) in the pre-correction image to coordinates (X', Y')=(X+$X_B$, Y) in the captured image after correction (corrected image).

On the other hand, when $X \geq X_B$, the pixel is included in the left image in the pre-correction image. For this reason, the position correction unit 603 moves the pixel arranged at the coordinates (X,Y) in the pre-correction image to coordinates (X', Y')=(X-$X_B$, Y) in the captured image after correction (corrected image).

Through such correction processing, the right image area and the left image area are switched, a position of each image area is corrected to a position corresponding to the optical system. In the present embodiment, the correction processing (switching processing) described above is performed, but arbitrary processing may be performed as long as the position of each image area can be corrected to the position corresponding to the optical system.

Adjustment Unit 604

The adjustment unit 604 performs, for example, adjustment of the center coordinates of the foreign matter area data in the foreign matter information. The processing of the adjustment unit 604 will be described below using the flowchart of FIG. 13.

Foreign Matter Removal Unit 605

The foreign matter removal unit 605 uses the foreign matter information adjusted by the adjustment unit 604 to remove foreign matters from the captured image corrected by the position correction unit 603. In the present embodiment, the foreign matter removal unit 605 removes foreign matter by copying nearby pixels on the top, bottom, left, and right side of the pixel of the foreign matter area in the captured image to the pixels of the foreign matter area. However, a method of removing the foreign matter is not particularly limited and may be a method of removing foreign matter on the basis of another captured image that is close in time, and various known schemes may be used. Further, the processing of removing the foreign matter may be performed by another information processing apparatus that receives the corrected captured image and the adjusted foreign matter information from the PC 500.

Exposure Area Calculation Unit 606

Figure 11:
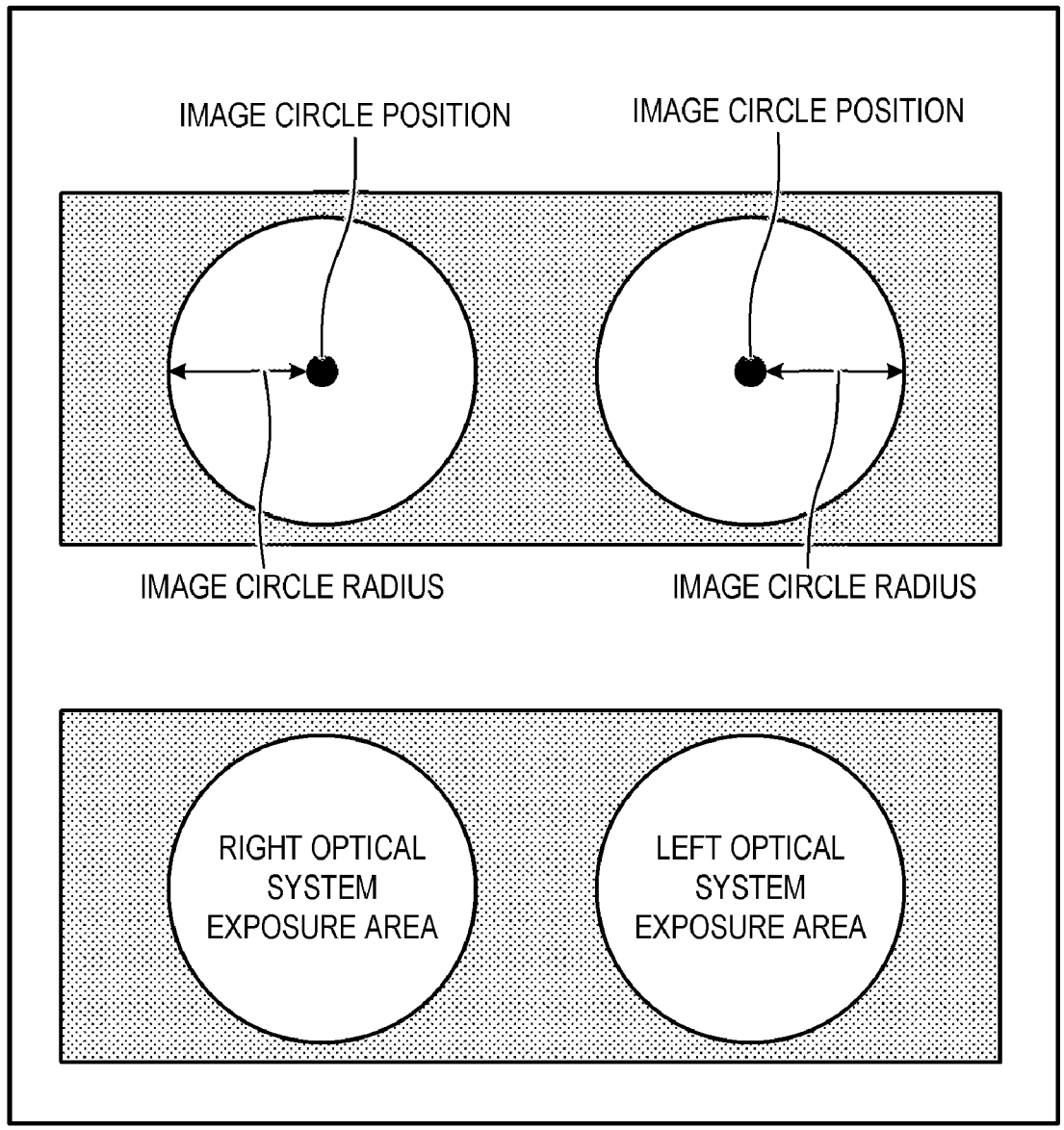
FIG. 11 is a diagram illustrating an exposure area.

The exposure area calculation unit 606 (an exposure determination unit) calculates an exposure area (an exposed area; an area in which an imaged object appears) on the basis of the image circle position and the image circle diameter recorded in the lens information. In a captured image (the pre-correction image) captured by a dual lens, two areas are calculated for the exposure area on the basis of the information of each optical system. Specifically, as illustrated in FIG. 11, in the captured image, a circular area centered at the image circle position and having a radius that is half the image circle diameter (image circle radius) corresponds to the exposure area. In this case, the exposure area calculation unit 606 may calculate the exposure area in consideration of the image circle position deviation.

Foreign Matter Removal Processing

Figure 12:
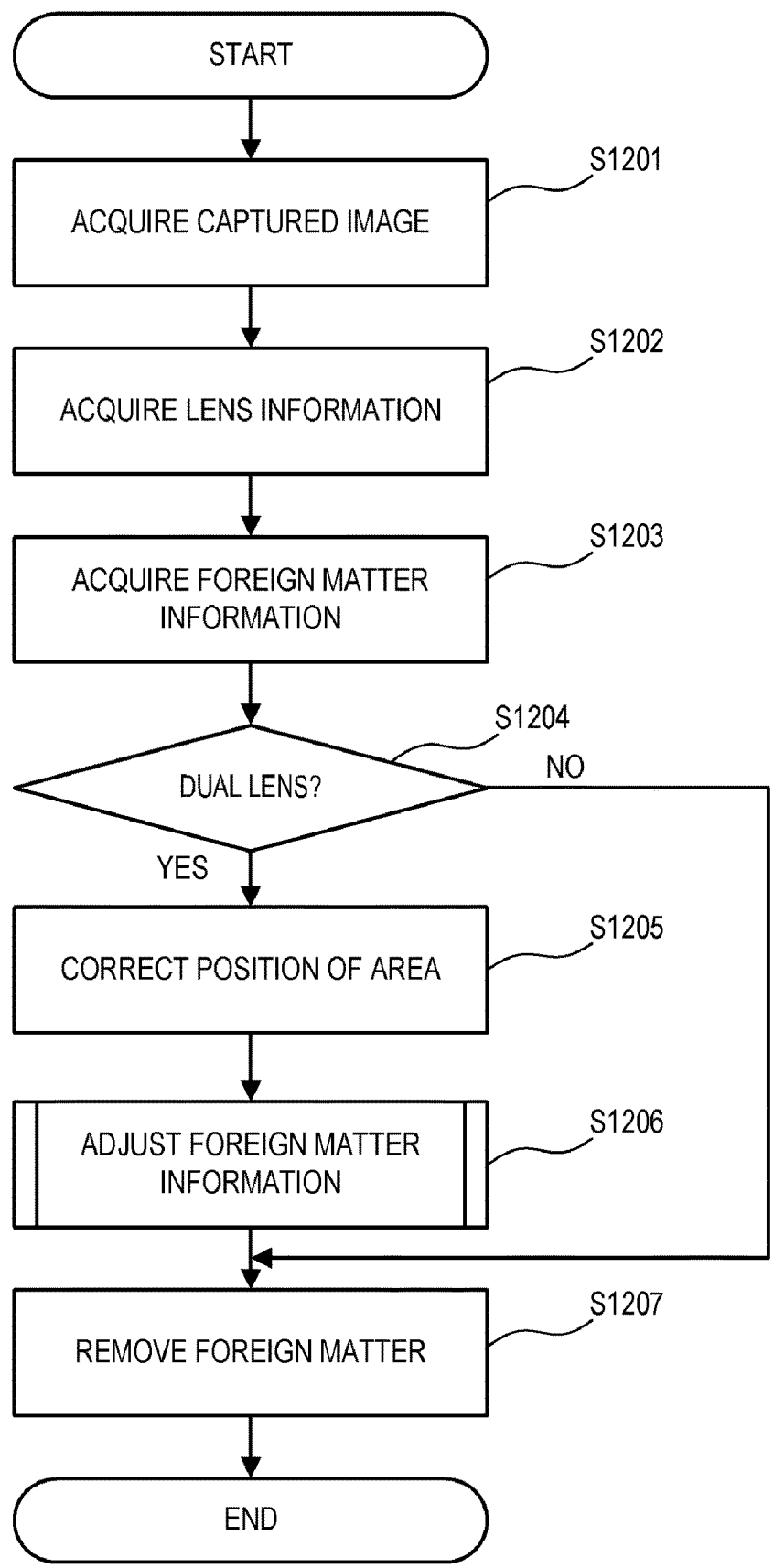
FIG. 12 is a flowchart of foreign matter removal processing.

Foreign matter removal processing according to the present embodiment performed by the PC 500 will be described with reference to a flowchart of FIG. 12. Processing of the flowchart of FIG. 12 is realized by the control unit 501 (processor) developing a program stored in the ROM 502 to the RAM 503 and executing the program. Specifically, the processing of the flowchart of FIG. 12 is realized by the control unit 501 operating as each configuration illustrated in FIG. 6.

In step S1201, the image acquisition unit 600 acquires the image file (see FIG. 7) including the captured image from the recording medium 504.

In step S1202, the lens information acquisition unit 601 acquires the lens information from the lens information area in the image file.

In step S1203, the foreign matter information acquisition unit 602 acquires the foreign matter information from the other-information area in the image file.

In step S1204, the lens information acquisition unit 601 determines whether or not the lens used for capturing of the captured image is a dual lens (including a plurality of optical systems) on the basis of the lens flag included in the lens information. When a determination is made that the lens used for imaging is a dual lens (the captured image includes two areas including a right image area and a left image area), the processing proceeds to step S1205. When a determination is made that the lens used for imaging is not a dual lens (the captured image does not include two areas including the right image area and the left image area), the processing proceeds to step S1207.

In step S1205, the position correction unit 603 performs correction processing (switching processing) to switch between the right image area and the left image area in the captured image on the basis of the lens information.

In step S1206, the adjustment unit 604 adjusts the center coordinates of the foreign matter information (performs adjustment processing). Details of the adjustment processing in step S1206 will be described below using FIG. 13.

In step S1207, the foreign matter removal unit 605 removes the foreign matter from the captured image on which the correction processing has been performed, on the basis of the foreign matter information. That is, when the captured image includes the right image area and the left image area (YES in step S1204), the foreign matter removal unit 605 removes the foreign matter on the basis of the foreign matter information adjusted in step S1206. On the other hand, when the captured image does not include the right image area and the left image area (NO in step S1204), the foreign matter removal unit 605 removes the foreign matter on the basis of the unadjusted foreign matter information.

Image adjustment (for example, brightness value adjustment, color adjustment, or the like) that does not involve coordinate conversion may be performed between step S1204 (or step S1206) and step S1207.

Adjustment Processing; S1206

Figure 13:
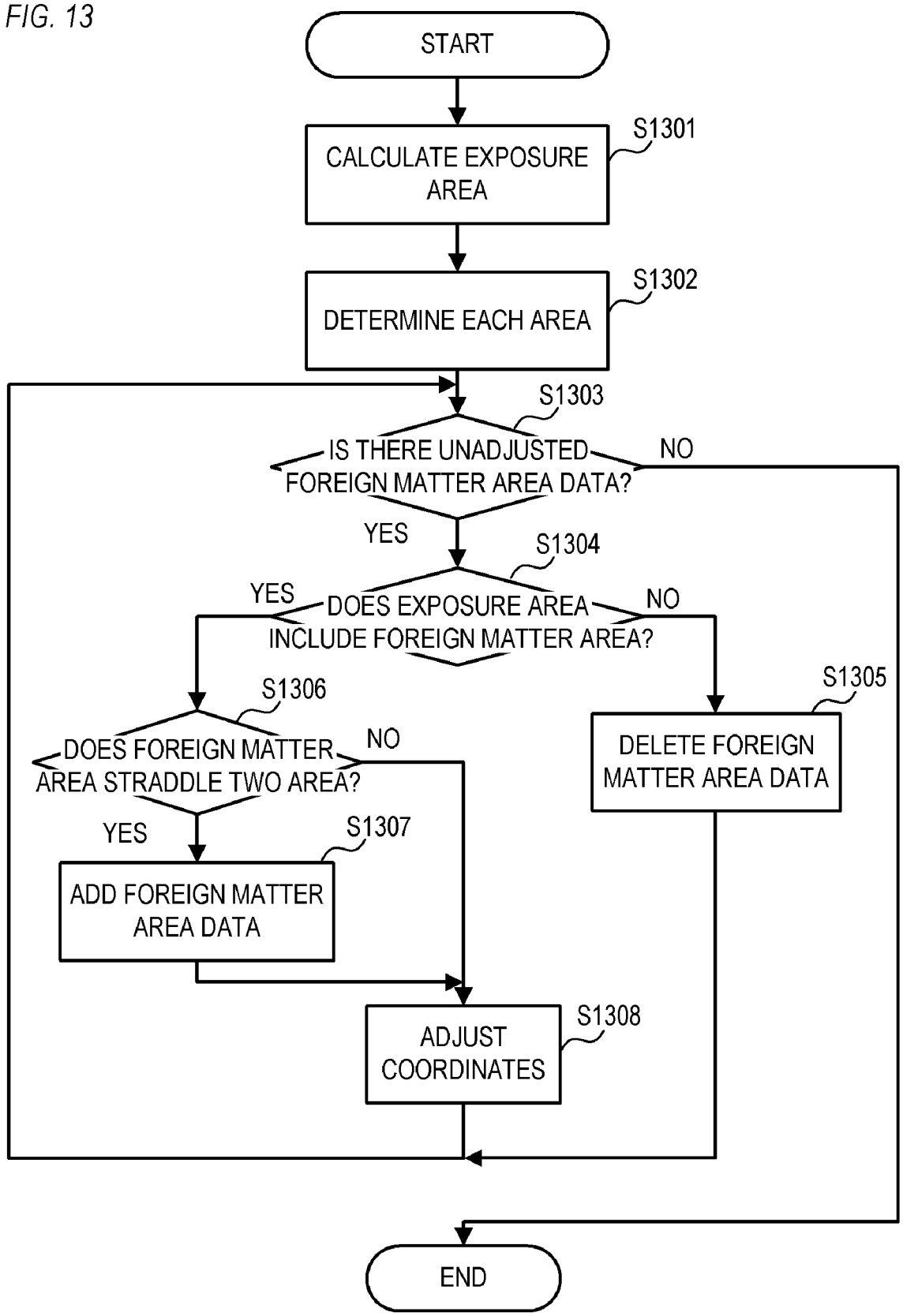
FIG. 13 is a flowchart of adjustment processing.

The adjustment processing performed in step S1206 will be described with reference to the flowchart of FIG. 13.

In step S1301, the exposure area calculation unit 606 calculates the exposure area (an area in which the imaged object appears; an area other than a black area) in the captured image before correction processing, on the basis of the lens information (the lens setting value and the individual value).

In step S1302, the adjustment unit 604 determines the right image area and the left image area in the captured image before correction processing on the basis of the angle of view indicated by the lens information.

In step S1303, the adjustment unit 604 determines whether or not unadjusted foreign matter area data (foreign matter area data on which the adjustment of the coordinates have not been performed in step S1308) is included in the foreign matter information. When a determination is made that the unadjusted foreign matter area data is included in the foreign matter information, the processing proceeds to step S1304. When a determination is made that all the pieces of foreign matter area data in the foreign matter information have been adjusted, the processing of the flowchart of FIG. 13 ends.

In step S1304, the adjustment unit 604 selects one piece of foreign matter area data from the unadjusted foreign matter area data. The adjustment unit 604 determines that the foreign matter area indicated by the selected foreign matter area data (hereinafter referred to as a "selected foreign matter area") is included in (is overlapped with) the exposure area (the exposure area in the captured image before correction processing). Specifically, when at least one pixel among all the pixels included in the selected foreign matter area is included in the exposure area (is overlapped with the exposure area), the adjustment unit 604 determines that the selected foreign matter area is included in the exposure area. When a determination is made that the selected foreign matter area is not included in the exposure area, the processing proceeds to step S1305. When a determination is made that the selected foreign matter area is included in the exposure area, the processing proceeds to step S1306.

In step S1305, the adjustment unit 604 determines that the foreign matter area data indicating the selected foreign matter area in the foreign matter information is unnecessary because the selected foreign matter area is not included in the exposure area. This is because the foreign matter does not affect a display of the object in the captured image. The adjustment unit 604 deletes the foreign matter area data indicating the selected foreign matter area from the foreign matter information. At the same time, the adjustment unit 604 decrements the foreign matter data count in the foreign matter information by 1 to update the foreign matter information. According to step S1305, since a likelihood of unnecessary processing being performed in the foreign matter removal processing (step S1207) can be reduced, it is possible to efficiently perform the foreign matter removal processing.

In step S1306, the adjustment unit 604 determines whether or not the selected foreign matter area straddles the right image area and the left image area. The selected foreign matter area straddling the right image area and the left image area means that both of the right image area and the left image area in the captured image before the correction processing include at least one pixel of the selected foreign matter area. When a determination is made that the selected foreign matter area straddles the two areas (the right image area and the left image area), the processing proceeds to step S1307. When a determination is made that the selected foreign matter area does not straddle the two areas, the processing proceeds to step S1308.

Figure 14:
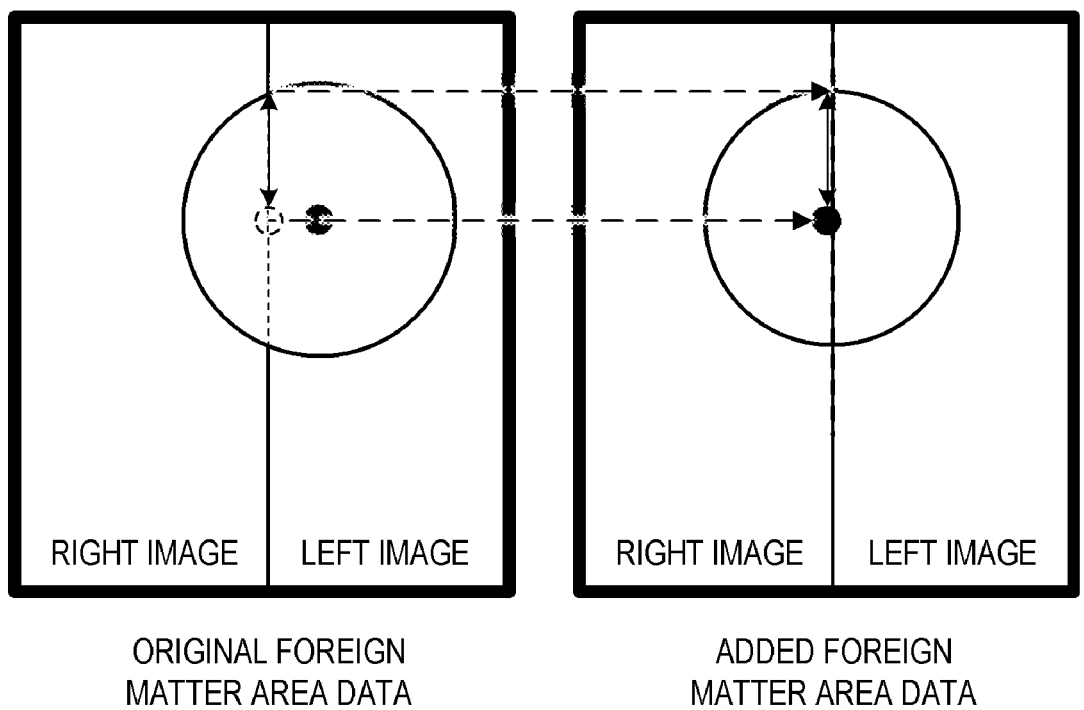
FIG. 14 is a diagram illustrating an addition of foreign matter area data.

In step S1307, the adjustment unit 604 adds the foreign matter area data corresponding to (belonging to) an area that does not include the center coordinates of the foreign matter area data (one of the right image area and the left image area in the captured image before the correction processing) of the selected foreign matter area. FIG. 14 is a diagram illustrating an example of the foreign matter area data to be added.

For example, the adjustment unit 604 determines the coordinates closest to the center coordinates in an area in which the center coordinates of the selected foreign matter area in the areas of the right image and the left image are not included, to be the center coordinates of the foreign matter area data to be added (referred to as "additional center coordinates"), as illustrated in FIG. 14. The center coordinates of the foreign matter area data to be added may be coordinates of a position line-symmetrical to the center coordinates of the selected foreign matter area with respect to the boundary line B (the boundary line B between the right image area and the left image area).

The adjustment unit 604 determines a distance between a pixel farthest from the additional center coordinates and the additional center coordinates in an area in which the center coordinates of the selected foreign matter area are not included (one of the right image area and the left image area) in the circular area determined from the foreign matter area data, to be a radius of the foreign matter area data to be added. The radius of the foreign matter area data to be added may be the same value as the radius of the foreign matter area data of the selected foreign matter area.

Further, the adjustment unit 604 increments the foreign matter data count in the foreign matter information by 1 so that the foreign matter data count in the foreign matter information matches the actual number of pieces of foreign matter data.

Figure 10:
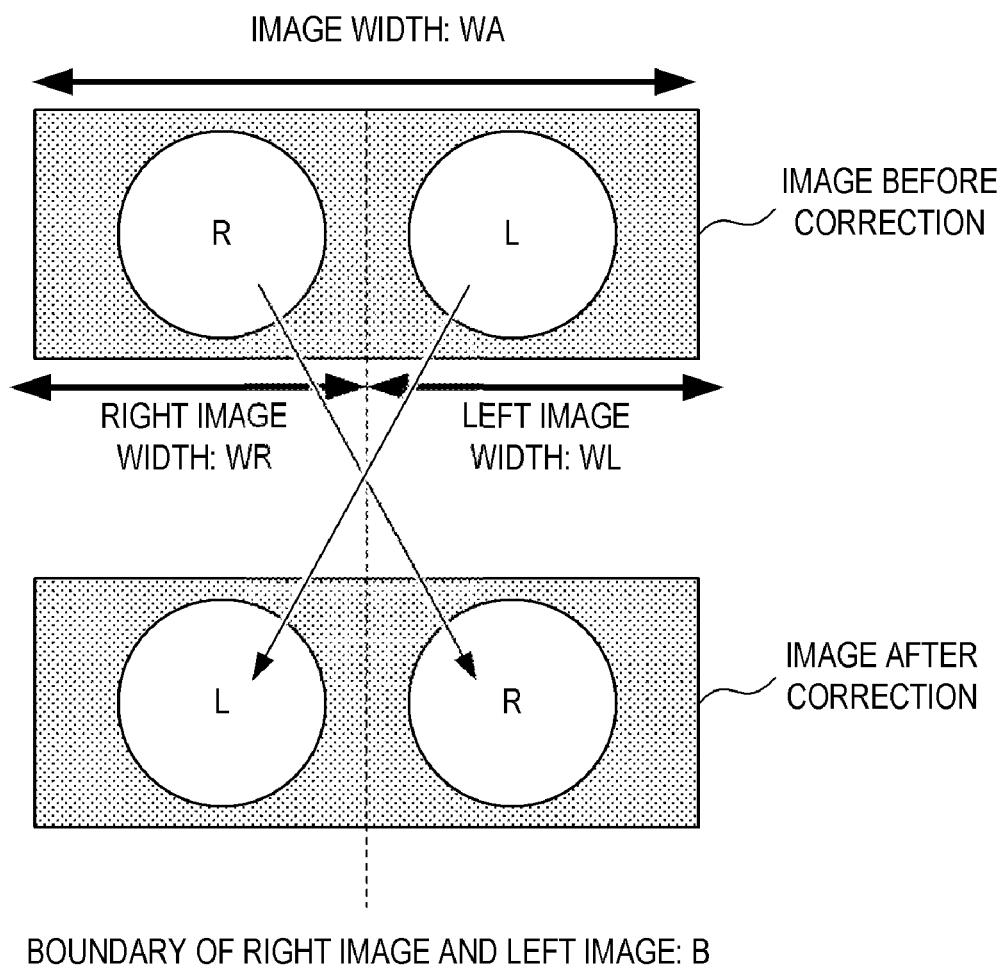
FIG. 10 is a diagram illustrating correction of positions of two images.

In step S1308, the adjustment unit 604 performs the same coordinate calculation (switching processing) as that of the position correction unit 603 on the center coordinates of the foreign matter area data depending on whether the center coordinates belong to any one of the right image area and the left image area of the captured image before correction (see FIG. 10). Accordingly, the adjustment unit 604 adjusts a position (center position) of the foreign matter information so that the center coordinates of the foreign matter area data matches the coordinates of the foreign matter in the captured image. That is, when a certain foreign matter area (the center coordinates of the foreign matter area) in the captured image belongs to the right image area, the adjustment unit 604 converts the center coordinates of the foreign matter area from the coordinates of the right image area before correction into the coordinates of the right image area after correction. On the other hand, when a certain foreign matter area (the center coordinates of the foreign matter area) in the captured image belongs to the left image area, the adjustment unit 604 converts the center coordinates of the foreign matter area from the coordinates of the left image area before correction into the coordinates of the left image area after correction.

According to the above, since the position of the foreign matter area is adjusted on the basis of the lens information, it is possible to appropriately perform the foreign matter removal processing even after the left and right areas are switched so that a positional relationship between the two optical systems and a positional relationship between the two left and right areas are the same.

Further, in the above, "when A is equal to or greater than B, the processing proceeds to step S1, and when A is smaller (lower) than B, the processing proceeds to step S2" may be rephrased as "when A is greater (higher) than B, the processing proceeds to step S1, and when A is equal to or smaller than B, the processing proceeds to step S2". On the other hand, "when A is greater (higher) than B, the processing proceeds to step S1, and when A is equal to or smaller than B, the processing proceeds to step S2" may be rephrased as "when A is equal to or greater than B, the processing proceeds to step S1, and when A is smaller (lower) than B, the processing proceeds to step S2". Therefore, unless there is a contradiction, the expression "equal to or greater than A" may be replaced with "A or greater (higher; longer; more) than A" or may be rephrased as "greater (higher; longer; more) than A" or may be replaced with "greater (higher; longer; more) than A". On the other hand, the expression "equal to or smaller than A" may be replaced with "A or smaller (lower; shorter; less) than A" or may be replaced with "smaller (lower; shorter; less) than A" or may be rephrased as "smaller (lower; shorter; less) than A". Also, "greater (higher; longer; more) than A" may be rephrased as "equal to or greater than A" and "smaller (lower; shorter; less) than A" may be rephrased as "equal to or smaller than A".

Although the present invention has been described in detail on the basis of preferred embodiments thereof, the present invention is not limited to these specific embodiments, and various forms without departing from the gist of the present invention are included in the present invention. Some of the above-described embodiments may be combined appropriately.

Each functional unit in each of the embodiments (each modification) may or may not be individual hardware. Functions of two or more functional units may be implemented by common hardware. Each of a plurality of functions of one functional unit may be realized by separate hardware. Two or more functions of one functional unit may be realized by common hardware. Further, each functional unit may or may not be realized by hardware such as an ASIC, FPGA, and DSP. For example, an apparatus may include a processor, and a memory (storage medium) in which a control program is stored. Functions of at least some of the functional units of the apparatus may be realized by the processor reading and executing the control program from the memory.

According to the present invention, it is possible to remove the foreign matter from the captured image with high accuracy even after the switching of the areas in the captured image is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088305, filed on May 31, 2022, which is hereby incorporated by reference herein in its entirety.

What is claimed is:

1. An information processing apparatus comprising:
a processor; and
a memory storing a program which, when executed by the processor, causes the information processing apparatus to
acquire a captured image,
acquire lens information on a first optical system and a second optical system in a case where the captured image includes a first area corresponding to a first optical image input via the first optical system, and a second area corresponding to a second optical image having a predetermined parallax with respect to the first optical image and input via the second optical system,
acquire foreign matter information indicating one or a plurality of foreign matter areas in the captured image,
correct a position of the first area and a position of the second area on a basis of the lens information, and
adjust the foreign matter information on a basis of the lens information,
wherein the lens information includes information on an optical axis center of the first optical system and an optical axis center of the second optical system in the captured image, and
the position of the first area and the position of the second area in the captured image are switched on a basis of the optical axis center of the first optical system and the optical axis center of the second optical system.

2. The information processing apparatus according to claim 1,
wherein the position of the first area and the position of the second area are corrected by performing correction processing based on the lens information on each of the first area and the second area, and
the foreign matter information is adjusted by performing the correction processing on each of the one or plurality of foreign matter areas indicated by the foreign matter information.

3. The information processing apparatus according to claim 1, wherein the foreign matter information includes, for each foreign matter in the captured image, area data including information on center coordinates and a radius of a circular area indicating an area of the foreign matter.

4. The information processing apparatus according to claim 3, wherein information on the center coordinates included in the foreign matter information is adjusted on a basis of the lens information.

5. The information processing apparatus according to claim 4, wherein, in a case where there is an area of a first foreign matter straddling both the first area and the second area in the captured image before correction, new area data corresponding to the first area or the second area that does not correspond to center coordinates of a circular area indicating the area of the first foreign matter is added to the foreign matter information.

6. The information processing apparatus according to claim 1, wherein, when the program is executed by the processor, the program further causes the information processing apparatus to remove foreign matter from the captured image on a basis of the adjusted foreign matter information.

7. The information processing apparatus according to claim 1, wherein, in a case where the captured image does not include the first area and the second area, the foreign matter information is not adjusted.

8. An imaging apparatus comprising:
an image sensor configured to perform capturing of the captured image including one or a plurality of optical images corresponding to one or a plurality of optical systems; and
the information processing apparatus according to claim 1.

9. An information processing apparatus comprising:
a processor; and
a memory storing a program which, when executed by the processor, causes the information processing apparatus to
acquire a captured image,
acquire lens information on a first optical system and a second optical system in a case where the captured image includes a first area corresponding to a first optical image input via the first optical system, and a second area corresponding to a second optical image having a predetermined parallax with respect to the first optical image and input via the second optical system,
acquire foreign matter information indicating one or a plurality of foreign matter areas in the captured image,
correct a position of the first area and a position of the second area on a basis of the lens information, and
adjust the foreign matter information on a basis of the lens information,
wherein, when the program is executed by the processor, the program further causes the information processing apparatus to
determine an exposure area in the first area and the second area on a basis of the lens information, and
in a case where information on a second foreign matter is included in the foreign matter information and an area of the second foreign matter does not overlap the exposure area, the information on the second foreign matter is deleted from the foreign matter information.

10. An information processing method comprising:
acquiring a captured image,
acquiring lens information on a first optical system and a second optical system in a case where the captured image includes a first area corresponding to a first optical image input via the first optical system, and a second area corresponding to a second optical image having a predetermined parallax with respect to the first optical image and input via the second optical system, acquiring foreign matter information indicating one or a plurality of foreign matter areas in the captured image, correcting a position of the first area and a position of the second area on a basis of the lens information, and adjusting the foreign matter information on a basis of the lens information, wherein the lens information includes information on an optical axis center of the first optical system and an optical axis center of the second optical system in the captured image, and the position of the first area and the position of the second area in the captured image are switched on a basis of the optical axis center of the first optical system and the optical axis center of the second optical system.

11. A non-transitory computer readable medium that stores a program, wherein the program causes a computer to execute the information processing method according to claim 10.

\* \* \* \* \*